United States Patent [19]

Penner et al.

[11] Patent Number: 5,343,482
[45] Date of Patent: Aug. 30, 1994

[54] METHOD AND APPARATUS FOR DETECTING PULSE DENSITY VIOLATIONS IN T1 TRANSMISSION

[75] Inventors: Gordon A. Penner, Port Moody; Winston K. C. Mok; Steven F. Lang, both of Vancouver; Charles K. Huscroft, Coguitlam, all of Canada

[73] Assignee: PMC-Sierra, Inc., Burnaby, Canada

[21] Appl. No.: 730,536

[22] Filed: Jul. 16, 1991

[51] Int. Cl.[5] ............................................. G06F 11/00
[52] U.S. Cl. .................................... 371/57.2; 371/57.1
[58] Field of Search ..................... 371/48, 57.1, 57.2, 371/63, 55; 341/59, 64, 91; 375/21

[56] References Cited

U.S. PATENT DOCUMENTS

| | | | |
|---|---|---|---|
| 4,750,179 | 1/1988 | Davidow et al. | 371/57.2 |
| 4,853,931 | 8/1989 | Gorshe | 371/57.2 |
| 4,860,324 | 8/1989 | Satomura | 371/57.2 |
| 5,119,380 | 2/1992 | Ohwada et al. | 371/57.2 |
| 5,285,459 | 2/1994 | Okuyama et al. | 371/57.1 |
| 5,295,012 | 3/1994 | Wilson et al. | 359/135 |

Primary Examiner—Robert W. Beausoliel, Jr.
Assistant Examiner—Albert Decady
Attorney, Agent, or Firm—Shlesinger, Arkwright & Garvey

[57] ABSTRACT

A method of detecting a pulse density violation in the T1 transmission of digital signals, which includes counting bits in sets of "k" successively in n serial stages generating an empty-out signal on detection of an "empty" set of "k" bits, and generating a pulse density violation on detecting a second set of "k" zero bits in the "n" stages of bits at a time when the empty-out signal is present.

11 Claims, 5 Drawing Sheets

METHOD AND APPARATUS FOR DETECTING PULSE DENSITY VIOLATIONS IN T1 TRANSMISSION

BACKGROUND

The present invention relates to a method and apparatus for detecting pulse density violations in the T1 transmission of digital signals.

In the transmission of digital signals, the information is transmitted in frames and synchronized by a process called framing. Each frame contains 193 bits of data with 24 frames making up an extended super frame of 4,632 bits. Some of the bits are used for synchronization and some for error detection. The common North American standard for the transmission of T1 information is specified in ANSI T1.403-1989 which provides that there be a minimum of N "ones" in each and every time window of 8(N+1) time slots or bits where N can equal from 1 to 23. The time windows defined by the ANSI standard consist of a smallest window of two octets covering bits $A_0$ to $A_{15}$. The largest window contains 24 octets covering the most recent 192 digit time slots of $A_0$ to $A_{191}$.

One way of ensuring the integrity of the transmitted data and being able to recover a clock from the incoming data is to ensure that there are a sufficient number of "ones" in a 192 bit window or time frame and monitoring the data to see that it has the required number of "one" bits. Thus, the ANSI T1 standard ensures that one will be able to recover a clock from the incoming data as well as prescribing a standard for the industry. Presently, the only known methods of monitoring the number of "ones" and ensuring that there are at least N "ones" in 8(N+1) time slots is to record a violation and maintain that violation status until all 193 good bits comes through. Such schemes do not allow bit by bit monitoring and identification of both the offending bit (i.e. the bit that puts the window into violation) and the saviour bit (i.e. the bit that corrects the violation). Bit-by-bit monitoring would allow "stuffing" of a correction bit into the required location, as well as better performance monitoring.

The only known technique used to detect and report the presence and absence of pulse density violations is combinational logic. However, such a technique requires an enormous number of input combinations and makes the task difficult.

Accordingly, it is an object of the invention to provide an improved method of detecting pulse density violations. It is a further object of the invention to provide a simpler method of detecting pulse density violations.

SUMMARY OF THE INVENTION

According to the invention there is provided a method of detecting a pulse density violation in the T1 transmission of digital signals, which includes counting bits in sets of "k" successively in n serial stages, generating an empty-out signal on detection of an "empty" set of "k" bits, and generating a pulse density violation on detecting a second set of "k" zero bits in the "n" stages of bits at a time when the empty-out signal is present.

The value of "n" may be 24 and that of "k" may be 8.

Advantageously, the method includes setting a flag to "full" on the arrival of a "one" at the first bit location at any of the "n" stages and then setting the flag to "empty" once the "one" has been followed by "k" zeros.

Upon a second "one" following a first "one" in a given stage and separated by less than "k" "zeroes", advancing a "one" to the next stage and placing a "one" in the first bit location of the given stage.

In another aspect of the invention there is provided an apparatus for detecting a pulse density violation in the T1 transmission of digital data where it is required that there be a minimum of N "ones" in each and every time window of k (N+1) time slots of bits. The apparatus includes means for counting bits in sets of "k", successively, in "N+1" serial stages, means for generating an empty-out signal on detection of an "empty" set of "k" bits, and means for generating a pulse density violation on detecting a second set of "k" zero bits in the "N+1" stages of bits at a time when the empty-out signal is present.

The apparatus may further include means for setting a flag to "full" on arrival of a "one" at the first bit location at any of the "N+1" stages and then setting the flag to "empty" once the "one" has been followed by k "zeroes". It may also include means for advancing a "one" in a given stage to the next stage and placing a "one" in the first bit location of the given stage, upon a second "one" following a first "one" in the given stage and separated by less than k "zeros". The value of "k" may be eight and that of "N" may be 23.

Since the windows are overlapping and increase by one stage at a time, it is possible to simulate the pulse density of an incoming stream of data by rearranging the data stream so that there is only one "one" per octet. Thus, if there were two "ones" in the first octet then the pulse density of the first window would be satisfied. After the entry of "one" or a few more "zeroes" there would be one "one" in the first octet and one "one" in the second. After a few more "zeroes" there would be two "ones" in the second octet and finally one and then none. In the altered bit stream the arrival of the second "one" would cause one to advance to the first bit position of the second octet and another to the first bit position of the first octet. In both cases after a count of 8 the most recent "one" in the first octet would advance to the first bit position of the second octet and after a further count of 8 it would advance to the third octet. Thus, in both cases the first window would go into pulse density violation at the same time since it is the transferral of the most recent "one" out of the first octet that results in that octet being signalled "empty". Thereafter the second, third, etc., octets in succession are caused to go "empty" upon reaching a count of 8, 16, 24, etc. Once the first octet is "empty" a second time at the same time a subsequent "one" is "empty", then a pulse density violation is indicated. A pulse density violation is indicated if any two octets are "empty" simultaneously. An initial pulse density violation is caused by the first octet going "empty" for a second time, but a pulse density violation could be caused later by two downstream octets being caused to go "empty" as a result of the initial pulse density violation being propagated down the chain of octets by, for example, sequences of seven "zeroes" and a "one".

BRIEF DESCRIPTION OF THE DRAWINGS

The novel features believed characteristic of the invention are set forth in the appended claims. The invention itself, as well as other features and advantages thereof, will be best understood by reference to the description which follows read in conjunction with the accompanying drawings, wherein:

DETAILED DESCRIPTION WITH REFERENCE TO THE DRAWINGS

In the transmission of digital data in accordance with a standard set down by the American National Standard for Telecommunications known as ANSI T1.403-1989, there must be n "ones" in each and every time window of $8(n+1)$ digit time slots where n can equal 1 through 23. Thus, if a customer were attempting to transmit data to a telephone company there would ordinarily be some kind of system designed to detect violations of the required number of "ones" as a means to ensure the integrity of the signal received. Because of the enormous number of input combinations, the straightforward application of combinational logic to detect such pulse density violations would require an unreasonably large number of gates.

The ANSI specification defines 23 overlapping time windows as shown below.

| Window Number "n" | Bits | Octet |
|---|---|---|
| 1 | $[A_0, A_1, \ldots, A_7][A_8, \ldots, A_{15}]$ | $O_0$ to $O_1$ |
| 2 | $[A_0, \ldots, A_7] \ldots [A_{16}, \ldots, A_{23}]$ | $O_0$ to $O_2$ |
| . | . | . |
| . | . | . |
| . | . | . |
| 23 | $[A_0, \ldots, A_7] \ldots [A_{184}, \ldots, A_{191}]$ | $O_0$ to $O_{23}$ |

Thus, each successive window has only one more octet than the preceding window. Window 23 violates the minimum pulse density requirement if it contains fewer than 23 "ones" and, in general, window "i" violates the minimum pulse density requirement if it contains fewer than "i" ones. It will be noted that if the pulse density in the nth time window has been exceeded, then the pulse density in the (n+1)th window has at least been met. This observation means that the circuit handling each octet can be made identical and be required to communicate only with its nearest neighbours, thus, greatly simplifying the design.

The present embodiment maintains an alternate encoded data stream that has the same pulse density properties as the original. In this alternate stream each octet has a maximum of a single "one". If the pulse density of an octet is exceeded then the extra "ones" are shifted forward to the next higher octets but always maintaining seven "zeros" between them. Thus, the circuit associated with each octet need only contain a flag to show whether the octet contains a "one", and a simple counter used to keep track of the location of the "one" within the octet. The octet circuits are connected serially with the output of octet $O_i$ going to the input of octet $O_{i+1}$ and the input of the first octet $O_0$ tied to the serial input data stream.

Figure 1:
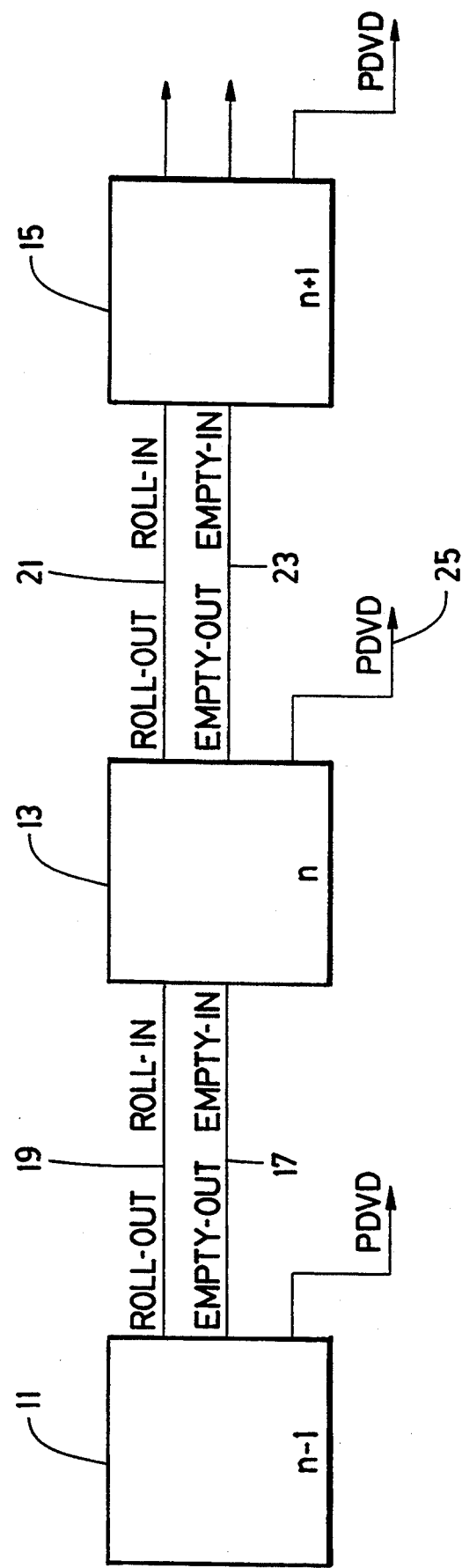
FIG. 1 is a schematic diagram of three time windows in the total of 24 time windows showing their interconnection.

A block diagram showing the operation of an octet or "slice" together with preceding and subsequent octets is shown in FIG. 1. In this case block or octet n 13 has a roll-in line 19, a roll-out line 21, an empty-in line 17, an empty-out line 23 and a pulse density violation detect line or PDVD line 25. The roll-in line of one block is the roll-out line of the preceding block while the empty-in line of one block is the empty-out line of the preceding block. The roll-in line 19 of block 13 and all other blocks in the line correspond to the density bit line along which "ones" and "zeros" from the input to the system travel. The empty-out signal indicates if any preceding octets are "empty". The "empty" condition of a particular block or octet is indicated by an internal flag (see FIG. 3). The bit position of any "high" pulses received on the roll-in line 19 of block 13 is tracked by an internal 3 bit counter.

In operation when a "high" bit appears on the roll-in line 19 of block 13 the internal flag of block 13 is set to "full" (indicating that the pulse density requirement for that octet has been met) and the internal 3 bit counter is cleared and commences to count in accordance with an input clock signal derived from the system input pulse code modulated signal. If another "high" bit arrives while the flag is full, the counter is reset or cleared again, a "high" bit will be generated on roll-out line 21 to stage n+1, the flag remains at "full" and the empty-out signal 23 remains "low" taking on the value of the empty-in signal 17. The flag output from block n is directed to an OR gate together with the empty-out signal from block n−1 to provide the empty-in signal for block n+1. Thus, if any of blocks 1 to n are "empty", a "high" signal is generated as the empty-in signal to block n+1. A pulse density violation will be detected in block n if the empty-in signal to block n is "high" and the flag inside block n is "empty".

Figure 2:
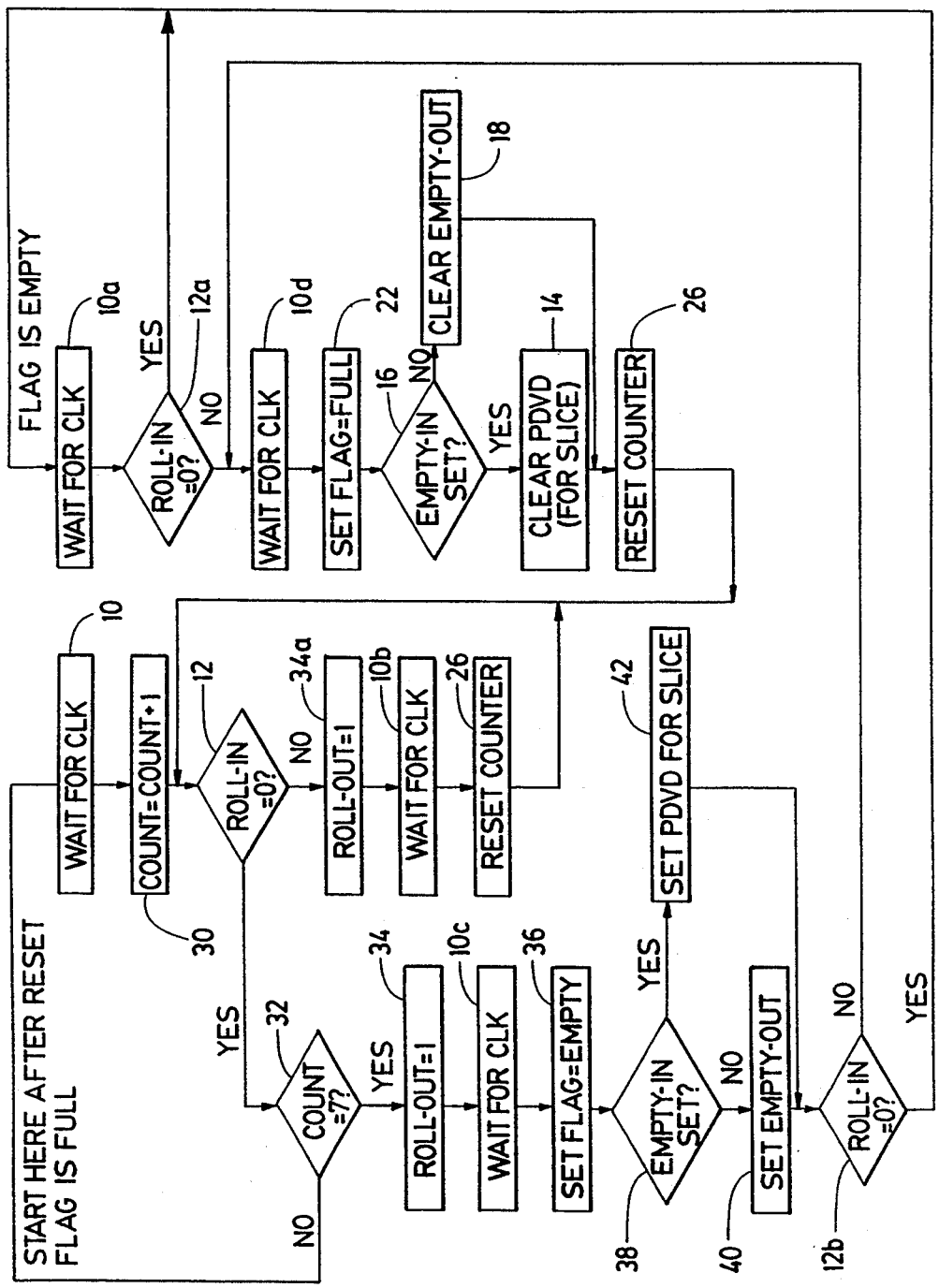
FIG. 2 is a flow chart showing the algorithm for one of the octets.

A flow diagram shown in FIG. 2 sets out the decision tree for one time window. Initially the system is initialized with the flags of all octets set to "full". It then waits for a clock pulse to arrive before accepting input data as shown at block 10. Upon arrival of the clock pulse, the counter is incremented as shown at block 30. The clock signal is derived from incoming pulse code modulated data (PCM) and data is sampled on the rising edge of the derived clock signals. The input data sampling is shown in block 12 where line 19 is tested to see if it is "high" or "low". If "high", the roll-in is "high" and the roll-out signal for that octet is also set equal to "one" as at block 34a. The system then waits for another clock as shown at block 10b. Upon arrival of the clock pulse the counters are reset by the "high" level of the roll-in signal still remaining as shown at block 26 on the rising edge of the clock pulse. The system then returns to test whether or not the roll-in signal level on line 19 is "low".

If the roll-in signal level is in fact "low", the count in the counter is checked to see if it has yet reached "seven". If it has not, then the system returns to block 10 to await the next clock pulse. If it has, then a "high" roll-out signal is generated at block 34 after which the system proceeds to block 10c and waits for the next clock pulse. On arrival of the next clock pulse the flag is set to empty as shown at block 36 and then the level of the empty-in line 17 is tested as shown at block 38 to determine if it has been set "low". If it has, then the empty-out line 23 for that octet is set "low" at block 40.

If the empty-in line 17 has been set "high", then the PDVD for that octet is cleared and the system goes to block 12b where the roll-in signal level is tested to determine whether or not it is "low".

If "low", then the system goes to block 10a where it waits for the next clock pulse. On the rising edge of the next clock pulse, the roll-in line 19 is tested to determine if it is "low". If it is, then the system returns to block 10a to repeat the cycle. If the roll-in signal level is "high" the system awaits the next clock pulse at block 10d. On arrival of the next clock pulse the flag is set to "full" as shown at block 22 and the system goes to block 16 where the empty-in line is tested. If "low" then the PVDV for that octet is cleared as shown at block 14, the counter reset as shown at block 26 and the system directed to block 12. If the empty-in line is "high" then the empty-out line 23 is cleared and the counter is reset at block 26 and the system directed to block 12.

Figure 3:
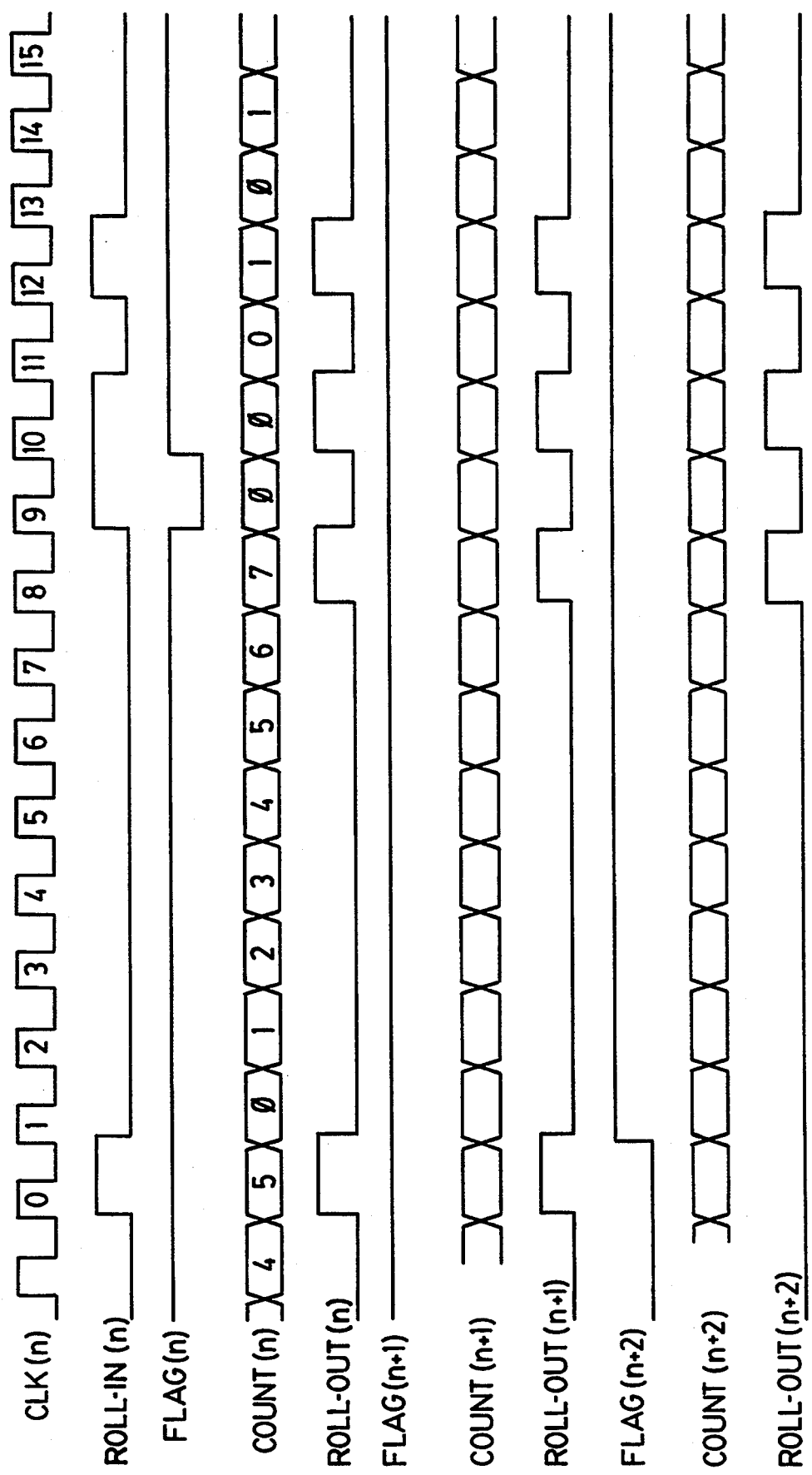
FIG. 3 is a timing diagram for the flow chart of FIG. 2.

A timing diagram shown in FIG. 3 shows the relationship of the various timing signals. The top waveform shows the clock pulses. The fourth waveform shows the number of counts in the nth counter while the second waveform shows the roll-in signal level and the third waveform shows the flag signal level with a low signal level corresponding to an "empty" condition. The fifth waveform shows a roll-out signal from the nth octet or stage. The flag, count and roll-out waveforms for the (n+1)th and (n+2)th octets correspond to the sixth, seventh and eighth and ninth, tenth and eleventh waveforms, respectively.

The waveforms for the nth stage shows the counter counting clock pulses with the "0th" clock pulse causing the recordal of the 5th count in the nth stage or octet. A roll-in pulse arrives slightly after the rising edge of the "0th" clock pulse. The roll-in pulse causes the nth stage counter to reset on the rising edge of the "1st" clock pulse since it arrives slightly after the start of the "0th" clock pulse and hence misses the rising edge of the latter pulse at which point data is sampled. However, the roll-in pulse lasts through the rising edge of the "1st" clock pulse and resets the "1st" stage counter during the latter-mentioned rising edge.

The roll-in pulse to the first octet, in this case where the flag is full, causes a roll-out pulse to the (n+1)th stage and causes the counter for the latter stage to be reset also. Since the flag of the (n+1)th stage is full, a further roll-out pulse to the (n+2)th stage is also produced. The roll-out pulse to the (n+2)th stage causes the flag to be set to full and the counter for that octet to begin counting.

The arrival of the "8th" clock pulse a roll-out pulse is generated which resets the nth stage counter to zero. A roll-out signal is also generated in the (n+1)th and (n+2)th stages. The nth stage roll-in waveform shows two successive roll-in pulses immediately following the roll-out pulse from that octet. The flag for the nth stage is reset to "full" on the 10th clock pulse, the nth stage counter is reset to "zero" and roll-out pulses are generated in all three octets. The second roll-in pulse causes the counter of the nth octet to begin counting after the flag is reset to "full". However, another roll-in pulse occurring on the 12th clock pulse resets the counters to zero on the 13th clock cycle and causes roll-out pulses on all three stages which also sets the (n+1)th and (n+2)th counters to zero on the rising edge of the 13th clock pulse.

Figure 4:
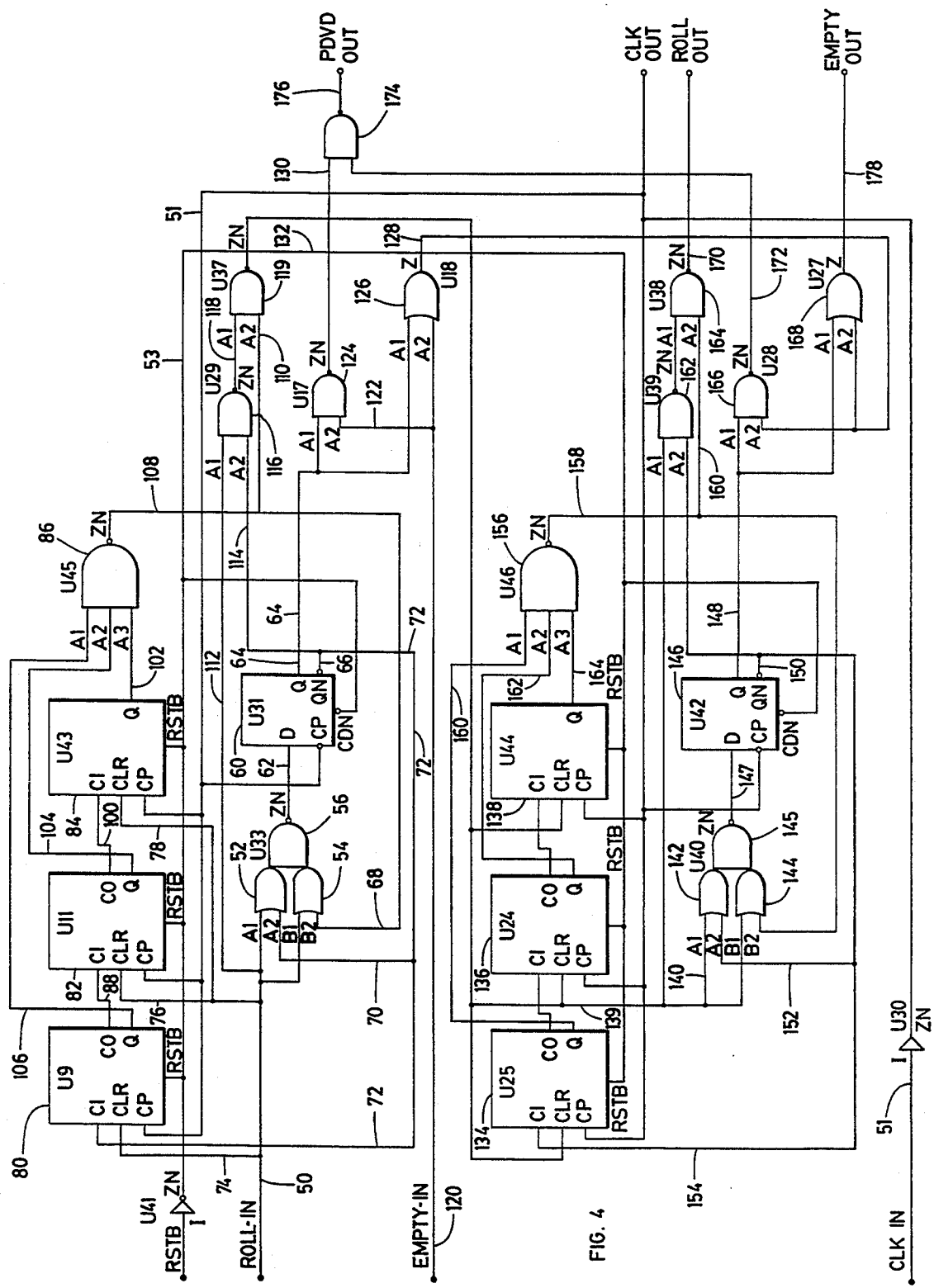
FIG. 4 is a block diagram schematic showing the circuit diagram for the pulse density violation detector for two octets.

A more detailed schematic showing the circuit diagram for two octets is seen in FIG. 4. In this case a roll-in line 50 leads to a flag assembly comprised of OR circuits 52 and 54 and a NAND gate 56 having the outputs of each OR gate 52 and 54 as its input. The output 62 of the NAND gate 56 is connected to the D input of a flip flop 60.

The output of the roll-in line 50 also connects to the clear input of each of three bit counters 80, 82 and 84. The output of counter 80 is coupled by line 88 to the input of counter 82 and the output of counter 82 is coupled by line 100 to the input of counter 84. The Q output of counters 82, 84, and 86 are coupled by lines 106, 104 and 102, respectively, to the inputs of a NAND gate 86. The output of NAND gate 86 is connected by line 108 and line 68 to one input of OR gate 54. The QN output of flip flop 60 is connected by line 66, 72 and 70 to one input of OR gate 52. The QN output of flip flop 60 also connects to counter 80 via line 72. Roll-in line 50 connects to each of the other inputs of OR gates 52 and 54 and via line 112 to one input of NAND gate 116. The QN output of flip flop 60 is connected by line 114 to the other input of NAND gate 116. The output of NAND gate 116 connects by line 118 to an input of NAND gate 119, while the other input is connected by line 110 to the output of NAND gate 86. The output of NAND gate 119 is carried by line 132 to the clear inputs of each of three bit counters 134, 136 and 138 belonging to the next octet.

The Q output of flip flop 60 connects by line 64 to an input of NAND gate 124 and to one input of OR gate 126. The other input of NAND gate 124 connects by line 122 to empty-in line 120. Empty-in line 120 also connects to another input of OR gate 126. The output of NAND gate 124 connects by line 130 to one input of NAND gate 174 the output of which forms the pulse density violation detect output.

The circuit arrangement for the next octet is the same as that for the octet described above. In this case the flag is formed by OR gates 142 and 144, NAND gate 145 and flip flop 146. Again the output of each of the three bit counters 134, 136 and 138 is carried by lines 160, 162 and 164, respectively, to the input of NAND gate 156. The only difference is that the roll-out pulse from the first above-described circuit is carried by line 132 to the clear inputs of each of the three bit counters 134, 136 and 138 to the next stage flag input and to NAND gates 162 and 164 leading to the next stage roll-out line.

The pulse density violation detect output of the second above-mentioned octet is carried by line 172 to the other input of NAND gate 174. If either line 130 or 172 goes "low" then there is a pulse density violation output on line 176. The outputs of all of the 12 two octet stages are each connected to an input of a NOR circuit and the outputs of the NOR circuits are connected to inputs of a NAND circuit so that if any stage has a pulse density violation (i.e. its PDVD output goes "high") then a pulse density violation is declared. In addition, the empty-out line from the first above-mentioned stage is carried by line 128 to an input of OR gate 168 and NAND gate 166. The Q output of flip flop 146 which indicates whether the flag is "full" or "empty" for the second octet connects to the other input of OR gate 168 so that the output of OR gate 168 on line 178 is the empty-out for the second stage octet herein described. The Q output of flip flop 146 also goes to NAND gate 166 the output of which provides an input to NAND gate 174. Input clock line 51 couples to the inputs of all of the bit counters 80, 82, 84, 134, 136, and 138 and is also directed to the other octets in the system. Line 53 carries an initialization signal that initializes the bit counters on start-up.

Figure 5:
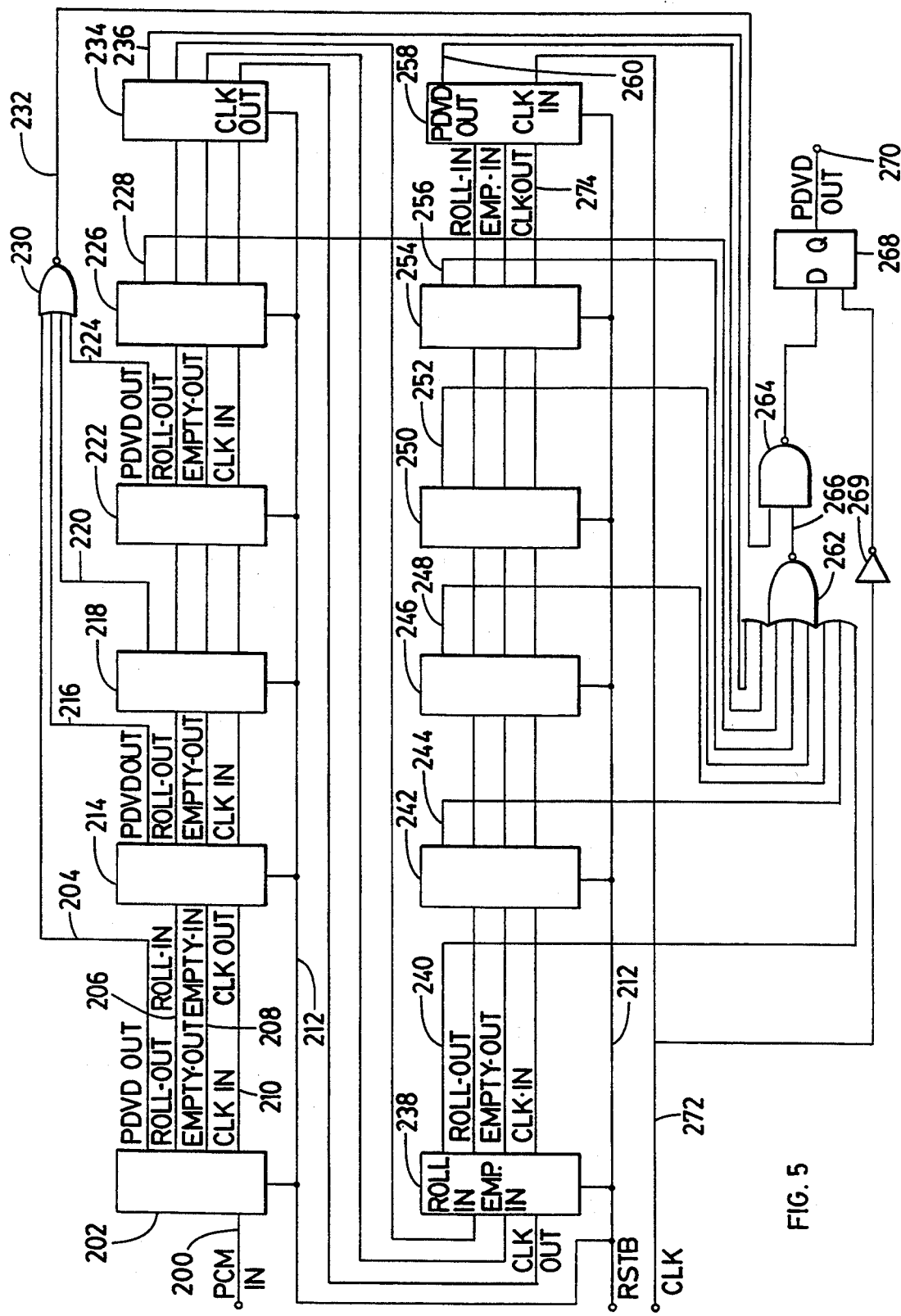
FIG. 5 is a block diagram showing a circuit diagram which includes all 24 octets shown in twelve blocks of two octets each.

Referring to FIG. 5 there is shown a block diagram of the entire system consisting of 24 octets shown in twelve blocks of two octets each. A pulse code modulated signal arrives on line 200 which is the same as the roll-in line 50 shown in FIG. 3 of an intermediate stage. However, line 200 goes to the first block 202 in the system. The roll-out terminal of block 202 connects by line 206 to the roll-in line of block 214. Similarly, the empty-out terminal of block 202 connects to the empty-in terminal of block 214 by line 208 and the clock output of block 214 connects to the clock input terminal of block 202. For each of the subsequent blocks 218, 222, 226, 234, 238, 242, 246, 250, 254, and 258 the roll-out, empty-out, and clock input terminals of one block are connected, respectively, to the roll-in, empty-in and clock output terminals of the next subsequent block. The clock line 272 is directed to the last block 258 first and then from the clock output of block 258 to the clock input of the immediately preceding block 254. The clock output of block 254 goes to the clock input of the next preceding blocks 250, and so on, in turn, until it reaches block 202.

The PDVD output terminals of blocks 202, 214, 218, and 224 are carried by lines 204, 216, 220, 224, respectively, to NOR circuit 230. The output 232 of NOR circuit 230 goes to one input of NAND circuit 264. The PDVD outputs of the remaining blocks 226, 234, 238, 242, 246, 250, 254, and 258 are carried by lines 228, 236, 240, 244, 248, 252, 256, and 260 to NOR circuit 262. The output of NOR circuit 262 on line 266 is directed to another input of NAND gate 264. The output of NAND gate 264, in turn, goes to the D input of flip flop 268. The Q output of flip flop 268 on line 270 forms the PDVD output for the system. An initialization reset pulse is carried by lines 212 to each of the blocks.

Referring to FIG. 4, initially when the RSTB initialization signal is sent out on line 53, the flags are all set to a "full" position in which the Q outputs of flip flops 60 and 146 are "low" or "zero". If on the next clock pulse a "zero" or "low" signal is received, the flag remains unchanged since lines 68 and 70 will both be "high" and, therefore, the output of NAND gate 56 will be "low". NAND gate 116 remains unchanged since its inputs of "zero" on lines 112 and 114 are unchanged. Similarly, if line 120 remains unchanged the inputs to gate 119 remain unchanged as do those to gates 124 and 126 provided the empty-in signal on line 120 remains unchanged.

As long as the Q output 64 of flip flop 60 is "high" (i.e. the flag is "empty") so that the QN output on line 66 is "low", the CI input to counter 80 will be "low" and the Q output on line 106 of counter 80 will remain "low". Once the CI output goes "high" because the flag is "full" or, in other words, because the Q output of flip flop 60 is "zero" (i.e. "full") then counter 80 begins to clock "zeroes" and "ones" to its Q output on line 106. Every time the Q output of counter 80 goes "high" and at the same time line 72 is "high", its "carry out" output "CO" on line 88 goes "high" (i.e. "1"), and conversely when the Q output 106 goes "low" or line 72 goes "low" (i.e. "zero") so does the CO output on line 88. (When the carry in input on line 72 is "low", the carry out output on line 88 stays "low"). When a "high" roll-in signal on line 50 is received the counter 80 clocks only "zeroes" to its Q output on line 106 thereby resetting the counter 80. Similarly counters 82 and 84 are also reset. The counters 80, 82 and 84 then commence counting to 7 at which time lines 106, 104 and 102 are all "high" and so the output of NAND gate 86 on line 108 goes "low". At the same time line 110 goes "low" and NAND gate 119 generates a "one" on line 132. Line 132 is the roll-out line for the first octet and the roll-in line for the second octet. The "zero" produced on line 108 after the counter comprised of bit counters 8, 82 and 84 reach "7" is applied to OR gate 54 producing a "one" on line 62 which is clocked to the Q output on line 64 on the next rising edge of the clock signal. The "one" on line 64 is transmitted by OR gate 126 to the empty-out line 128 and propagated to all subsequent octet circuits.

The roll-in bit on line 132 resets counters 134, 136 and 138. If flip flop 146 is "full" (i.e. its output on line 148 "low"), and therefore line 150 is "high" a "one" is generated on line 170 by gate 164 which is the roll-out line for the second octet.

If flip flop 146 is "empty" (i.e. its output on line 148 is "high"), and therefore line 150 is "low", gate 164 maintains a "zero" on roll-out line 170. Instead gates 142, 144 and 145 produce a "zero" on line 147 to the D input of flip flop 146. On the next rising edge of the clock on line 51, the "zero" is transmitted to the Q output on line 148 placing the flag for the second octet in a "full" condition. On this clock edge line 108 also goes "high".

If the Q output of flip flop 60 on line 64 is "high" (i.e. the flag is "empty") then a "one" is generated by OR gate 126 on line 128 and applied to one input of NAND gate 166. If at the same time the Q output of flip flop 146 on line 148 is "one" (i.e. the flag for the second octet is "empty") then a "zero" is produced on line 172 and a "one" is produced by gate 174 on output line 176 indicated a pulse density violation. A pulse density violation indicates two (or more) octets being "empty" simultaneously and is produced if either lines 172 or 130 go "low", assuming the empty-in to the first octet, line 120, is "low". A pulse density violation will also occur if line 64 is "low" but the empty-in line 120 is "high" due to an "empty" octet from a preceding octet (not shown).

The entire system as disclosed in FIG. 5 has the 12 blocks of two octets each coupled in series with the roll-out signal for one block being the roll-in signal for the next subsequent block and the empty-out signal for one being the empty-in signal for the next subsequent block. The PDVD signals for blocks 202, 214, 218 and 222 which are directed into NOR circuit 230 cause an output on line 232 which is "high" only if the inputs on each of lines 204, 216, 220 and 224 are "low". Similarly, the output on line 266 is "high" if and only if each of the inputs to NOR gate 262 are "zero". With both inputs to NAND gate 264 "high", the output of NAND gate 264 is "low" and the Q output on line 270 of flip flop 268 is "low". If any of the PDVD outputs is "high", one of the inputs on lines 266 or 232 will be "high", whichever one corresponds to the NOR gate into which the "high" PDVD signal is applied. Thus, the output of NAND gate 264 will be "high" and the Q output of flip flop 268 will also be "high".

It will be seen that the circuit will place seven "zeros" between every "one". In the event a second "one" arrives on the roll-in line 50 with less than seven "zeros" between it and a first "one", the counter, effectively placing a "one" in the first bit position and then rolls out a second "one" to the next octet. Thus, it is possible for a "one" to be advanced through all 24 octets if each is "full".

Thus, the octet circuits are functionally equivalent to a bit-by-bit monitoring of the PCM input signals so as to produce an immediate indication of an "empty" octet in the pulse stream. Moreover, the occurrence of two "empty" octets in a block of 192 bits is instantly detected as soon as the second "empty" set of eight bits has become "empty". The removal of the PDVD indication works in a similar way. As soon as there is only one "empty" octet the PDVD error is removed.

Although the circuit described is applicable to successive sets of 8 bits in a bit stream, it would be obvious to any person skilled in the art that the circuit could easily be modified to examine any members of bits in a set.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the true scope of the invention.

We claim:

1. A method of detecting a pulse density violation in the T1 transmission of digital signals, comprising:
   a) counting bits in sets of "k" successively in "n" serial stages;
   b) generating an empty-out signal on detection of an "empty" set of "k" bits;
   c) generating a pulse density violation on detecting a second set of "k" zero bits in the "n" stages of bits at a time when the empty-out signal is present; and
   d) advancing a "one" to the next stage and placing a "one" in the first bit location of the given stage upon a second "one" following a first "one" in a given stage and separated by less the "k" "zeroes".

2. A method according to claim 1, wherein "n" is 24 and "k" is 8.

3. A method according to claim 1, including setting a flag to "full" on arrival of a "one" at the first bit location at any of the "n" stages and then setting the flag to "empty" once the "one" has been followed by "k" zeros.

4. A method of detecting a pulse density violation in the T1 transmission of digital signals comprising:
   (a) counting bits bit-by-bit in sets of 8 bits successively in 24 stages;
   (b) generating an empty-out signal on detecting 8 "zeros" in a set of 8 bits;
   (c) setting a flag to "full" on arrival of a "one" to any of the 24 sets of 8 bits and then setting said flag to "empty" when the "one" has been followed by 8 successive "zeros";
   (d) generating a pulse density violation on detecting a second set of 8 "zero" bits in the 24 stages of bits at a time when the empty-out signal is present; and
   (e) advancing a "one" to the next stage and placing a "one" in the first bit location of a given stage upon arrival of a second "one" separated from a first "one" by less than 8 "zero" bits.

5. Apparatus for detecting a pulse density violation in the T1 transmission of digital data where it is required that there be a minimum of "N" "ones" in each and every time window of k (N+1) time slots of bits, comprising:
   a) means for counting bits in sets of "k", successively, in "N+1" serial stages;
   b) means for generating an empty-out signal on detection of an "empty" set of "k" bits;
   c) means for generating a pulse density violation on detecting a second set of "k" zero bits in the "N+1" stages of bits at a time when the empty-out signal is present; and
   d) means for advancing a "one" in a given stage to the next stage and placing a "one" in the first bit location of the given stage, upon a second "one" following a first "one" in the given stage and separated by less than k "zeroes".

6. Apparatus according to claim 5, including means for setting a flag to "full" on arrival of a "one" at the first bit location at any of the "N+1" stages and then setting the flag "empty" once the "one" has been followed by k−1 "zeroes".

7. Apparatus according to claim 5, wherein "k" is eight and "N" is 23.

8. Apparatus according to claim 6, wherein said bit counting means is an electronic counter.

9. Apparatus according to claim 6, wherein said flag means is a flip flop circuit controlled by logic whose output is set to a selected state upon arrival of a roll-in signal and said selected state activates said counter.

10. Apparatus according to claim 9, wherein said empty-out generating means is a logic circuit having one input coupled to an output of said flip flop and another coupled to an empty-out of a preceding stage, and which circuit provides an output if either input is present.

11. Apparatus according to claim 10, wherein said pulse density violation generating means includes a logic circuit having one input coupled to an output of said flip flop and a second input coupled to an empty-out signal generating means of a preceding stage, such that a pulse density violation signal is generated whenever either said flip flop indicates an "empty" "flag" or said empty-out signal indicates an "empty" previous stage.

* * * * *